United States Patent
Selvaraj et al.

(10) Patent No.: US 9,429,938 B2
(45) Date of Patent: Aug. 30, 2016

(54) METHOD AND APPARATUS FOR QUALIFYING PERFORMANCE OF A CONVENTIONAL CONTROL VALVE

(75) Inventors: Sankar Selvaraj, Singapore (SG); Lakshmi Kiran Kanchi, Singapore (SG); Ching Hua Joseph Lee, Singapore (SG)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 1123 days.

(21) Appl. No.: 13/250,172

(22) Filed: Sep. 30, 2011

(65) Prior Publication Data

US 2013/0085717 A1    Apr. 4, 2013

(51) Int. Cl.
*G06F 15/00* (2006.01)
*G05B 23/02* (2006.01)
*G05B 19/042* (2006.01)

(52) U.S. Cl.
CPC ....... *G05B 23/0235* (2013.01); *G05B 19/0428* (2013.01)

(58) Field of Classification Search
CPC ..................................................... G06F 15/00
USPC ........................................................ 702/182
See application file for complete search history.

(56) References Cited

U.S. PATENT DOCUMENTS

| 6,745,107 | B1* | 6/2004 | Miller .......................... 700/282 |
| 7,289,936 | B2* | 10/2007 | Singhal et al. ............... 702/182 |
| 2007/0088446 | A1* | 4/2007 | Srinivasan et al. ............ 700/32 |
| 2007/0288103 | A1* | 12/2007 | Choudhury et al. ........... 700/35 |
| 2008/0082181 | A1* | 4/2008 | Miller et al. ................... 700/30 |
| 2009/0112335 | A1* | 4/2009 | Mehta et al. .................. 700/29 |

\* cited by examiner

*Primary Examiner* — John Breene
*Assistant Examiner* — Yaritza H Perez-Bermudez
(74) *Attorney, Agent, or Firm* — Oblon, McClelland, Maier & Neustadt, L.L.P.

(57) ABSTRACT

A method of qualifying performance of a conventional control valve in a process plant, the valve being controlled by a controller, the method comprising a processor obtaining data samples from a database stored on a server of the process plant, each data sample comprising a process variable, a set-point, and a manipulated variable; the processor computing a non-linearity index from the data samples and determining if the non-linearity index is greater than a threshold value; if the non-linearity index is greater than the threshold value, the processor charting a plot of the process variable against the manipulated variable and determining if the plot has an elliptical or rectangular fit; and if the plot has an elliptical fit, the processor determining if a percentage of the total number of data samples lying within a theoretical ellipse encompassed within the elliptical fit is less than or equal to a preset percentage.

12 Claims, 4 Drawing Sheets

METHOD AND APPARATUS FOR QUALIFYING PERFORMANCE OF A CONVENTIONAL CONTROL VALVE

TECHNICAL FIELD

The present invention relates generally to qualifying performance of conventional control valves in a process plant.

BACKGROUND

Conventional control valves in process plants do not have smart positioners or other self-provided feedback mechanisms for allowing a user to tell how well such valves are performing. This also means that the cost of conventional control valves is low compared to smart valves, so that conventional valves can be expected to continue to account for more than half the total valve demand this year.

However, unchecked and undetected deterioration in a conventional control valve can have significant impact on process control, and in extreme cases, may lead to unscheduled plant shutdown. Considering that there are currently no online or real-time performance monitoring diagnostics tools for such conventional control valves available, while the usage of conventional control valves in process plants worldwide will continue to be high, this can be seen to be a problem of substantial scale.

SUMMARY

According to a first aspect, there is provided a method of qualifying performance of a conventional control valve in a process plant, the valve being controlled by a controller, the method comprising obtaining data samples from a database stored on a server of the process plant, each data sample comprising a process variable being a detected value associated with the valve, a set-point being a pre-determined desired value for the process variable, and a manipulated variable being a value sent from the controller to the valve for adjusting the process variable to reach the set-point; a processor computing a non-linearity index from the data samples and determining if the non-linearity index is greater than a threshold value; if the non-linearity index is greater than the threshold value, the processor charting a plot of the process variable against the manipulated variable and determining if the plot has an elliptical or rectangular fit; and if the plot has an elliptical fit, the processor determining if a percentage of the total number of data samples lying within a theoretical ellipse encompassed within the elliptical fit is less than or equal to a preset percentage.

The method may further comprise, if the plot has an elliptical or rectangular fit and the percentage is less than or equal to the preset percentage, the processor computing a model fitness stiction index of the plot relative to a standard valve stiction model, and determining if the model fitness stiction index is greater than a pre-set value.

The method may further comprise, if the model fitness index is lower than the pre-set value, the processor checking the data samples for detecting valve problems using a diagnostics module comprising a repository of pre-decided heuristic rules and user-configurable fuzzy logics.

The method may further comprise, if the non-linearity index is lower than a threshold value, the processor determining if there is a problem with the controller by checking if the manipulated variable and the process variable are both oscillating.

The method may further comprise the processor computing an oscillation regularity of the data samples, and wherein computing the non-linearity index is upon determining that the oscillation regularity is greater than a pre-arranged value.

The method may further comprise the processor checking the valve for saturation, and wherein computing the oscillation regularity is upon determining that the valve is not at saturation.

The method may further comprise the processor checking the data samples for set-point changes, and wherein checking the control valve for saturation is upon determining that changes in the set point are less than a pre-configured percentage.

The method may further comprise the processor checking the data samples for stationarity, and wherein checking the set-point for changes is upon determining that the prepared data is sufficiently stationary.

The method may further comprise filtering the data samples prior to processing the data samples.

The method may further comprise collecting a predetermined amount of the filtered data samples such that processing the data samples comprises processing the predetermined amount of the filtered data samples.

The database may be a real-time database.

According to a second aspect, there is provided an apparatus for qualifying performance of a conventional control valve in a process plant, the valve being controlled by a controller, the apparatus comprising a processor having a data preparation module configured to obtain data samples from a database stored on a server of the process plant, each data sample comprising a process variable being a detected value associated with the valve, a set-point being a pre-determined desired value for the process variable, and a manipulated variable being a value sent from the controller to the valve for adjusting the process variable to reach the set-point; and the processor having an analysis module configured to compute a non-linearity index from the data samples, to determine if the non-linearity index is greater than a threshold value, to chart a plot of the process variable against the manipulated variable, to determine if the plot has an elliptical or rectangular fit, and to determine if a percentage of the total number of data samples lying within a theoretical ellipse encompassed within the elliptical fit is less than or equal to a preset percentage.

The analysis module may further be configured to compute a model fitness stiction index of the plot relative to a standard valve stiction model and to determine if the model fitness stiction index is greater than a pre-set value.

The apparatus may further comprise the processor having a diagnostics module configured to check the data samples for detecting valve problems using pre-decided heuristic rules and fuzzy logics comprised in the diagnostics module.

The analysis module may further be configured to check if the manipulated variable and the process variable are both oscillating for determining if there is a problem with the controller.

The analysis module may further be configured to compute an oscillation regularity of the data samples and to determine if the oscillation regularity is greater than a pre-arranged value.

The analysis module may further be configured to determine if the valve is at saturation, to determine if there have been changes to the set-point changes that are less than a pre-configured percentage, and to determine if the data samples are sufficiently stationary.

The data preparation module may further be configured to filter the data samples prior to processing by the analysis module.

The apparatus may further comprise the processor having a data adjustment module configured to manage collecting of a predetermined amount of filtered data samples for processing by the analysis module.

BRIEF DESCRIPTION OF THE FIGURES

Preferred embodiments of the apparatus and method will now be described with reference to the accompanying figures in which.

DETAILED DESCRIPTION OF THE PREFERRED EMBODIMENTS

Exemplary embodiments of a method 100 and apparatus 200 for qualifying performance of a conventional control valve in a process plant 2 will now be described with reference to FIGS. 1 to 5.

Figure 1:
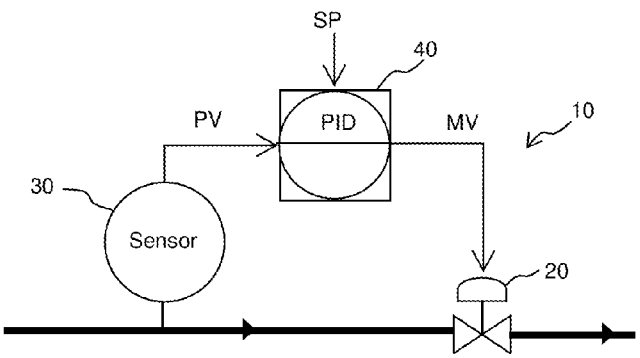
FIG. 1 is a schematic illustration of a conventional control valve in a process plant.
Figure 2:
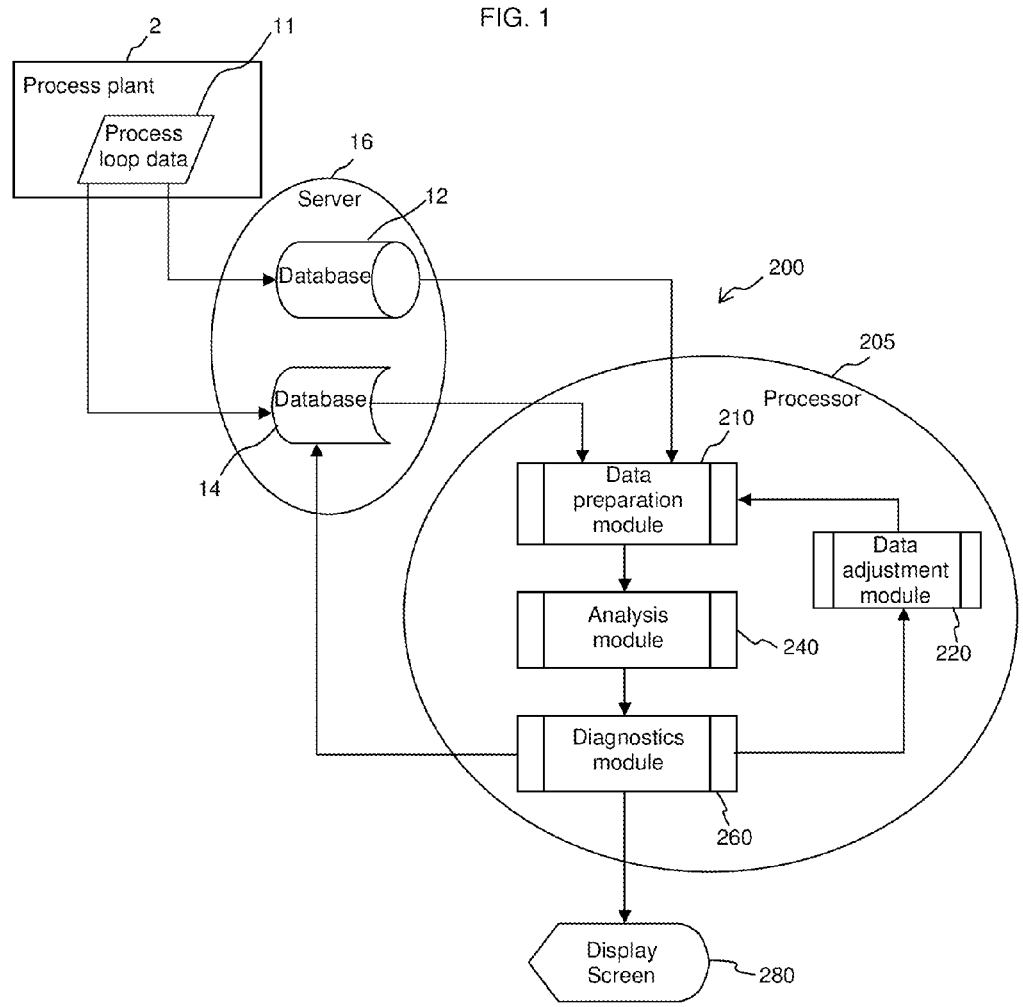
FIG. 2 is an architectural diagram of an exemplary apparatus for qualifying performance of the valve of FIG. 1.
Figure 3:
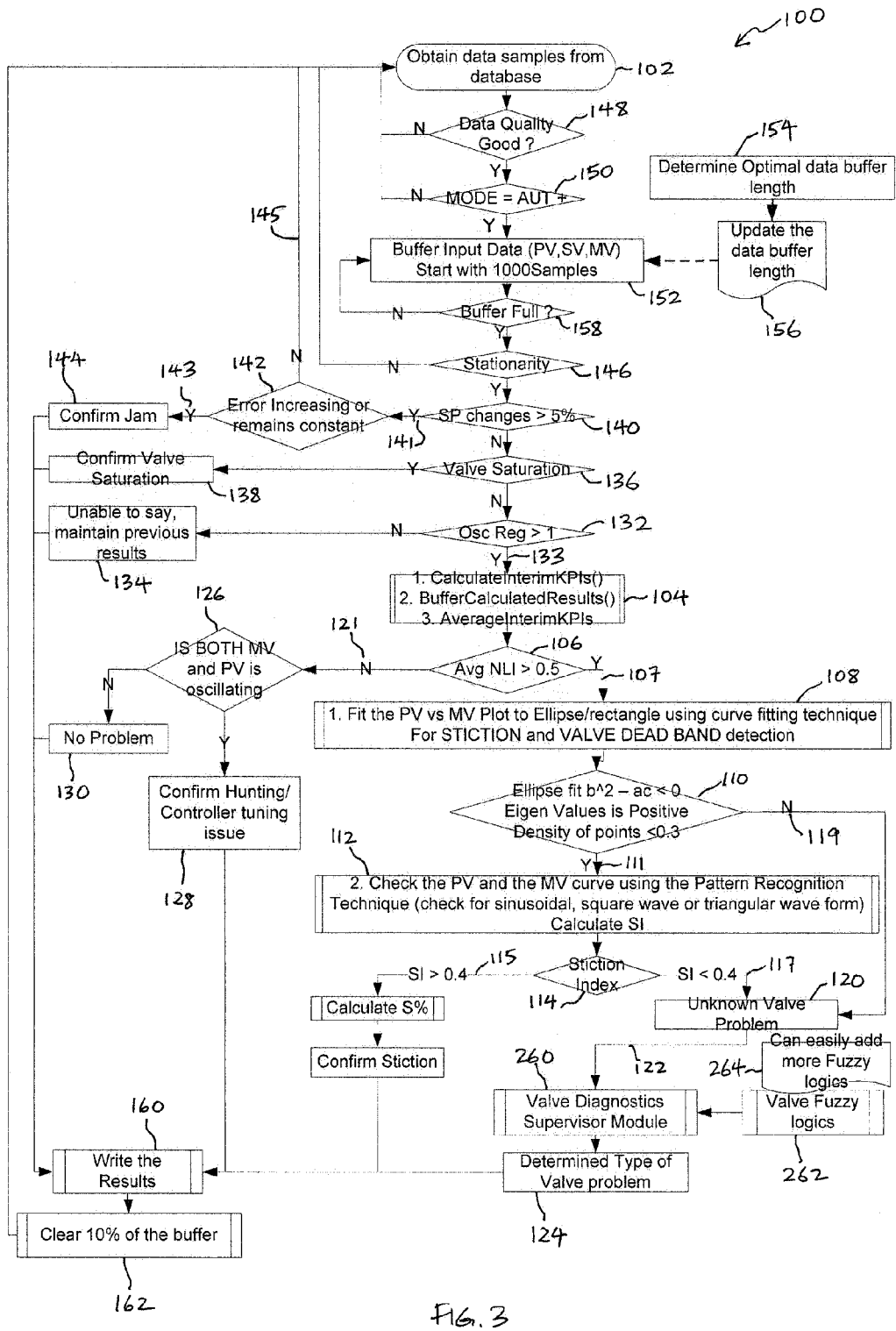
FIG. 3 is a flow chart of an exemplary method of qualifying the performance of the valve of FIG. 1.

As shown in FIG. 1, a control loop 10 in a process plant 2 comprises the conventional control valve 20, a sensor 30 and a controller 40. FIG. 2 shows the apparatus 200. The apparatus 200 comprises a processor 205 having a data preparation module 210 configured to obtain data samples from a database 12, 14, 102. Data in the database 12, 14 is input from process loop data 11 obtained during operation of the process plant 2. The database 12, 14 is preferably stored on a server 16. In a preferred embodiment, the database 12 is a real-time database 12 when it is desired to perform online diagnostics of the valve. Alternatively, the database 14 may be a historical or offline database 14 for performing offline diagnostics of the valve.

Each data sample obtained from the database 12, 14 comprises at least a process variable (PV), a set-point (SP) and a manipulated variable (MV) at a given point in time. The process variable is a detected value associated with the valve 20, and can be obtained from the process using the sensor 30. For example, the PV may be a flow rate detected by a flow meter 30 provided at a specific location in the process plant 2, the flow rate being controlled by the valve 20. The PV is normally transmitted to the controller 40. The set-point is a pre-determined desired value for the process variable. Continuing with the same example, the set-point would be a desired flow rate at the specific location of the process plant 2. The manipulated variable is a value sent from the controller 40 to the valve 20 for adjusting the PV to match the SP, usually in response to a previously detected PV. The MV typically comprises a specific valve setting, assuming that the valve 20 has adjustable valve settings. Thus, in the same example used above, if the flow meter 30 detects a PV in the process plant 2 that is lower than the desired SP, the controller 40 will send an MV to the valve 20 that is higher than the MV currently in use by the valve 20, with the intention of raising the PV to reach the desired SP.

Obtaining data samples by the data preparation module 210 may be performed by a processor 205 at an online sampling frequency ranging from seconds to ten minutes. In most industrial automation facilities, data sampling frequency of one second is not often feasible due to high data traffic in the communication channels. Thus, it is envisaged that a data sampling frequency of about 1 minute may be optimum.

The apparatus 200 also comprises the processor 205 having an analysis module 240 configured to process the data samples and to make comparisons against pre-established values. The processing preferably includes the processor 205 computing a non-linearity index from the data samples 104 and determining if the non-linearity index (NLI) is greater than a threshold value 106. In addition, a non-gaussianity index (NGI) may also be computed. The NLI and NGI are computed using known auto correlation functions, and will have a value of between 0 and 1. From experience, a certain value such as 0.5, for example, for the NLI is selected as the threshold value, above which there is likely to be a problem with the valve. It is envisaged that the threshold value for the NLI is configurable depending on the specific process that is controlled by the control loop 10, for example, flow, temperature, level and pressure. The threshold value should not be 0 since it has been validated by industrial data that using 0 as the threshold value does not produce reliable results in industrial applications.

Figure 4:
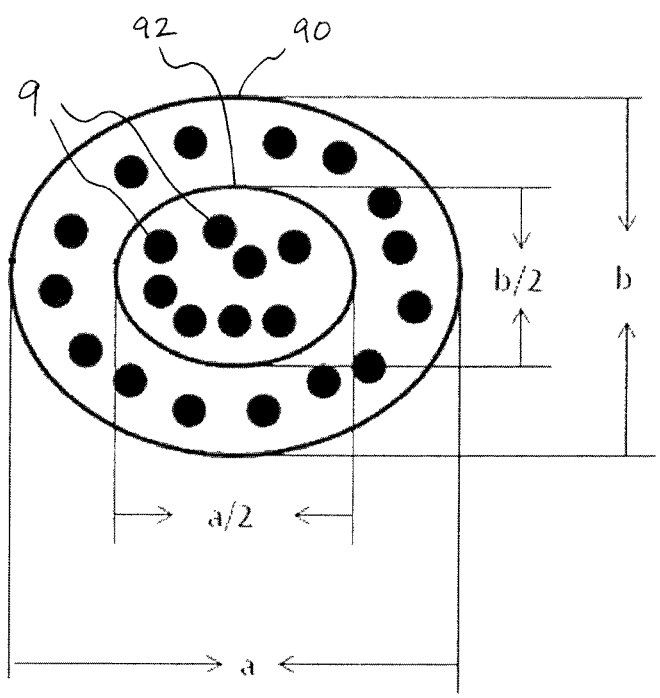
FIG. 4 is a schematic illustration of elliptical fit and a heuristic ellipse.

When the analysis module 240 of the processor 205 determines that the NLI is greater than the threshold value 107, the data samples are preferably further processed to chart a plot of the process variable against the manipulated variable 108. The analysis module 240 of the processor 205 then determines if the plot has an elliptical or rectangular fit 110. An elliptical fit 90 may be determined by checking if $b^2-ac<0$ as shown in FIG. 4, if the Eigen values are positive, and if a density of points is less than or equal to a preset percentage.

The density of points is defined as a percentage of the total number of data samples 9 lying within a heuristic ellipse 92 as shown. The heuristic ellipse 92 is a theoretical ellipse encompassed within the fitted ellipse 90. The heuristic ellipse 92 preferably has major and minor axes that are half the magnitude of the major and minor axes of the fitted ellipse 90 respectively. In order to confirm stiction, the density of points should be less than or equal to a preset percentage, in addition to the plot having an elliptical fit 90. The preset percentage can range from 30% to 50%. A preferred preset percentage is 30%. The density of points criterion therefore determines whether most of the data samples lie around a periphery of the fitted ellipse 90. This criterion is important because a conclusion of stiction based only on the plot having an elliptical fit may be an erroneous conclusion.

For example, a plot may appear to have an elliptical fit 90 but have the majority of points scattered within the elliptical fit 90 instead of around the periphery of the elliptical fit 90. Empirical studies show that such a case should not be associated with stiction problems. This means that likely stiction can only be concluded when the plot has an elliptical fit 90 together with the majority of data samples lying outside the heuristic ellipse 92, that is, when the data samples are mainly around the periphery of the elliptical fit 90. This occurs when the density of points is less than the preset percentage.

If the plot is found to have an elliptical or rectangular fit 90, 111 and the density of points is less than or equal to the preset percentage, the analysis module 240 further computes a model fitness stiction index of the plot relative to a standard valve stiction model 112. This can be achieved by using standard pattern recognition techniques to compare the plot against the standard valve stiction model, to check for sinusoidal, square wave or triangular wave forms. The analysis module 240 then determines if the model fitness stiction index is greater than a pre-set value typically known to arise due to valve stiction 114, for example 0.4, or 0.5. If so 115, stiction percentage may be calculated 116 and used to confirm stiction associated with the valve 118.

Alternatively, if the stiction index is found to be less than the pre-set value 117, this may be indicative of an unknown valve problem 120. Similarly, if the plot of PV against MV does not have an elliptical or rectangular fit 119, this may also be indicative of an unknown valve problem 120. Under such circumstances, the data samples may be directed to a diagnostics module 260 of the processor 205 provided in the apparatus 200, 122 to try and determine other types of valve problems 124 using pre-decided heuristic rules 262 and fuzzy logics 264 comprised in the diagnostics module 260.

Fuzzy logics 264 generally incorporates a simple, rule-based "IF X AND Y THEN Z" approach to solve any problem, rather than attempting to model a system mathematically. The fuzzy logics 264 used are preferably easily retrained, updated and added to, by tapping on the diagnostic skills of an experienced valve maintenance personnel or an experienced process Distributed Control System operator, and dependent on the knowledge base specific to the industry and to each unique plant.

A fuzzy logics model is empirically-based, relying on an operator's experience rather than their technical understanding of the system. For example, instead of dealing with temperature control in terms such as "SP=500 F", "T<1000 F", or "210 C<TEMP<220 C", terms like "IF (process is too cool) AND (process is getting colder) THEN (add heat to the process)" or "IF (process is too hot) AND (process is heating rapidly) THEN (cool the process quickly)" are used. These terms are imprecise and yet accurately descriptive of what must actually happen to keep a situation under control. This is analogous to a person adjusting water temperature in a shower if the water is too cold: the person will make the water comfortable very quickly with little trouble. Fuzzy logics is capable of mimicking such human behavior at a very high rate.

Figure 5:
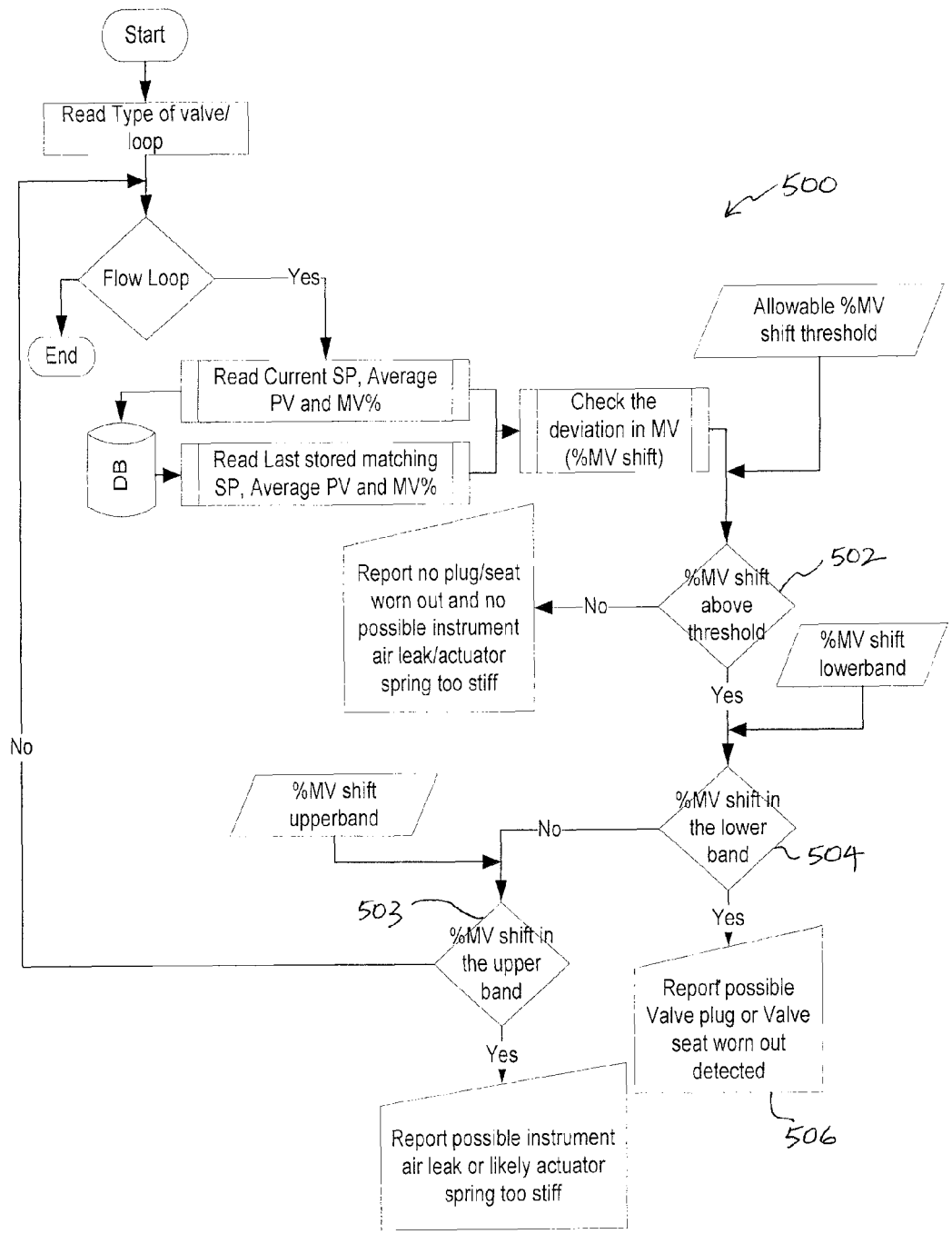
FIG. 5 is a flow chart of an exemplary application of fuzzy logics in a process plant.

With reference to FIG. 5, fuzzy logics 264 as configured by experienced maintenance engineers is explained below for deducing faults associated with a control valve, such as a plug or seat of the control valve being worn out, or leakage of instrument air to the control valve. In the flow control loop 500, if the MV shifts from a normal level to a value out of an allowable range while SP and PV are constant 502, this can mean two things: if the MV shift is lower 504 than the allowable range, the plug and seat are possibly worn out 506; if the MV shift is higher 503 than the allowable range, there is possibly a leak at the instrument air or an actuator spring is too stiff 505. By providing user-configurable fuzzy logics 264 in the diagnostics module 260, a mechanism is thus made available for users to apply their own know-how to the behavioral tracking of their unique plant assets.

In the step of determining whether the non-linearity index (NLI) is greater than a threshold value 106, if it is found that the computed NLI is lower than the threshold value 121, the analysis module 240 further checks if the manipulated variable and the process variable are both oscillating 126. If so, this confirms that there is a hunting or controller tuning issue 128. If not, this confirms that there is no problem with the valve 20, 130.

Prior to computing the NLI 106, the analysis module 240 may compute an oscillation regularity index of the data samples and determine if the oscillation regularity index is greater than a pre-arranged value 132, e.g., the pre-arrange value may be 1. Oscillation regularity index is used to monitor irregularities in the PV, SP and MV as a result of external irregularities. An oscillation regularity index greater than 1 may be indicative of a valve problem 133, and warrants the analysis module 240 proceeding with computing the NLI. If the oscillation regularity index is less than 1, 135, the method 100 is unable to determine if there is a valve problem and status quo is maintained 134.

Prior to determining if the oscillation regularity is greater than the pre-arrange value 132, the method 100 may further comprise the analysis module 240 determining if the valve 20 is at saturation 136. If the valve 20 is already saturated, no further steps are performed by the analysis module 240.

Prior to determining if the valve is saturated 136, the method 100 may further comprise the analysis module 240 checking the data samples for a percentage of set-point changes within a given time 140. This is because too many set-point changes in the given time would mean more fluctuations in the PV and MV within the given time, making it difficult for the analysis results to be meaningfully interpreted. If it is determined that there has been a greater percentage of set-point changes than a pre-configured percentage 141, the method 100 preferably further checks to see if the error, that is, the difference between SP and PV, increases or remains constant 142. If the error is increasing 143, this confirms that the valve 20 is jammed 144. On the other hand, if the error remains constant 145, the method can loop back to begin again with obtaining data samples from the database 12, 14, 102.

It is also preferable to determine if the data samples are sufficiently stationary 146 before the analysis module 240 checks the percentage of set-point changes 140 and performs the other process steps described above. This is to ascertain the performance of the valve 20 within a given band of PV and MV values.

In addition to obtaining data samples, the data preparation module 210 is preferably further configured to filter the data samples prior to processing by the analysis module 240 by checking if data quality is good 148. Filtering the data samples may include filtering for noise, checking the obtained data samples for inconsistency, mode constraints and other issues. Ideally, only good quality data should be used for processing by the analysis module 240. Also, it is envisaged that the method 100 and apparatus 200 are to be used for data obtained when the controller 40 is in automatic or cascade mode, therefore the data preparation module 210 is preferably also configured to confirm that the controller mode is automatic or cascade 150 before collecting a predetermined amount of filtered data samples 152 for processing by the analysis module 240.

Collection of the predetermined amount of filtered data samples is preferable managed by a data adjustment module 220 of the processor 205 in the apparatus 200. The data adjustment module 220 is configured to determine an optimal data buffer length and to update this 156 with the data preparation module 210. Determining the optimal data buffer length comprises analyzing a first set of data length collected, based on a default estimate, and then fixing an optimal buffer length for subsequent analysis. This is to cater for different types of loops, such as flow, temperature, pressure or level, behaving differently for any disturbance. Having an optimal buffer length avoids situations where insufficient data or an unnecessary amount of excess data is collected for further analysis of valve faults. Accordingly, the data preparation module 210 collects filtered data samples until the buffer, which length is determined by the data adjustment module 220, is full 158. The collected set of filtered data samples from the buffer is then provided to the analysis module 240 for processing.

Results from the analysis module 240 or diagnostics module 260 are subsequently displayed and recorded 160. Using appropriate hardware 280 such as a display screen, the results may be presented to a user. The apparatus 200 may also be configured to alert the user of any valve problems, such as via email or using mobile telephony short messaging service (sms). Recording of the results may comprise storing the results in the database 14.

After results have been obtained 160, a percentage of the buffer may be cleared 162 by the processor 205 for collecting new data samples to fill the optimal buffer length as determined by the data adjustment module 220. For example, 10% of the buffer may be cleared. Thus, each collection of data samples processed by the analysis module 240 is envisaged to comprise a percentage (e.g. 90%) of data samples from a previous collection and a remaining percentage (e.g. 10%) of data samples from a current data sampling. In this way, there is an overlap of data samples between one collection of data samples that is analyzed and the next collection of data samples that is analyzed.

Therefore, it can be said that performance data of the valve 20 is continually sampled, analyzed and reported, thereby allowing for real-time diagnostics of the valve 20 to be achieved despite the valve 20 being a conventional control valve 20 having no smart positioners or other self-provided feedback mechanisms. The present method 100 and apparatus 200 thus allow users to enjoy the benefits of using lower cost conventional control valves without worrying about undetected valve deterioration adversely affecting process control and plant performance, and without having to install additional smart positioners on the conventional control valves to run valve diagnostics. Real-time reporting of the performance of the valve 20 also allows users to prepare for maintenance activities beforehand.

Where data is obtained from the offline database 14, the data samples may be manually imported by a user using the processor 205 instead of automatically obtained by the data preparation module 210, and processing of the data samples performed by the analysis module 240 may be performed remotely and offline instead of in real time.

Whilst there has been described in the foregoing description preferred embodiments of the present invention, it will be understood by those skilled in the technology concerned that many variations or modifications in details of design or construction may be made without departing from the present invention.

The invention claimed is:

1. A method of qualifying performance of a conventional control valve that does not have a self-provided feedback mechanism that allows a user to qualify valve performance in a process plant, the valve being controlled by a controller, the method comprising:
    sensing, with a flow rate sensor, a flow rate at a location in the process plant, the flow rate being controlled by the conventional control valve;
    storing in a database of a server of the process plant the flow rate sensed by the sensor, a set-point being a pre-determined desired value for the flow rate, and a manipulated variable being a value sent from the controller to the conventional control valve for adjusting the flow rate to reach the set-point;
    a processor obtaining data samples from the database stored on the server of the process plant, each data sample comprising the flow rate sensed by the flow rate sensor, the set-point, and the manipulated variable;
    the processor computing a non-linearity index from the data samples and determining if the non-linearity index is greater than a threshold value;
    if the non-linearity index is greater than the threshold value the processor charting a plot of the process variable against the manipulated variable and determining if the plot has an elliptical or rectangular fit;
    if the plot has an elliptical fit, the processor determining if a percentage of the total number of data samples lying within a theoretical ellipse encompassed within the elliptical fit is less than or equal to a preset percentage;
    if the plot has an elliptical or rectangular fit and the percentage is less than or equal to the preset percentage, the processor computing a model fitness stiction index of the plot relative to a standard valve stiction model, and determining if the model fitness stiction index is greater than a pre-set value known to arise due to valve stiction;
    the processor determining whether valve stiction is associated with the conventional control valve based on whether the model fitness stiction index is greater than the pre-set value; and
    adjusting, using the controller, the flow rate at the location in the process plant to reach the set-point by sending the value corresponding to the manipulated variable to the conventional control valve.

2. The method of claim 1, further comprising, if the model fitness index is lower than the pre-set value, the processor checking the data samples for detecting valve problems using a diagnostics processor comprising a repository of pre-decided heuristic rules and user-configurable fuzzy logics.

3. The method of claim 1, further comprising the processor computing an oscillation regularity of the data samples, and wherein computing the non-linearity index is upon determining that the oscillation regularity is greater than a pre-arranged value.

4. The method of claim 3, further comprising checking the valve for saturation, and wherein computing the oscillation regularity is upon determining that the valve is not at saturation.

5. The method of claim 4, further comprising checking the data samples for set-point changes, and wherein checking the control valve for saturation is upon determining that changes in the set point are less than a pre-configured percentage.

6. The method of claim 5, further comprising checking the data samples for stationarity.

7. The method of claim 1, further comprising collecting a predetermined amount of the filtered data samples such that processing the data samples comprises processing the pre-determined amount of the filtered data samples.

8. An apparatus for qualifying performance of a conventional control valve in a process plant, the valve being controlled by a controller, the apparatus comprising:
    a conventional control valve that does not have a self-provided feedback mechanism that allows a user to qualify valve performance;
    a sensor that senses flow rate at a location in the process plant, the flow rate being controlled by the conventional control valve;

a server that includes a database storing the flow rate sensed by the sensor, a set-point being a pre-determined desired value for the flow rate, and a manipulated variable being a value sent from the controller to the conventional control valve for adjusting the flow rate to reach the set-point;

the controller configured to adjust the flow rate at the location in the process plant to reach the set-point by sending the value corresponding to the manipulated variable to the conventional control valve; and a processor configured to obtain data samples from the database stored in the server of the process plant, wherein the processor comprises a data preparation processor configured to obtain data samples from the database, each data sample comprising the flow rate sensed by the flow rate sensor, the set point and the manipulated variable, and an analysis processor configured to compute a non-linearity index from the data samples, to determine if the non-linearity index is greater than a threshold value, to chart a plot of the process variable against the manipulated variable, to determine if the plot has an elliptical or rectangular fit, and to determine if a percentage of the total number of data samples lying within a theoretical ellipse encompassed within the elliptical fit is less than or equal to a preset percentage, wherein the analysis processor is further configured to compute a model fitness stiction index of the plot relative to a standard valve stiction model and to determine if the model fitness stiction index is greater than a pre-set value known to arise due to valve stiction, and wherein the analysis processor is further configured to determine whether valve stiction is associated with the conventional control valve based on whether the model fitness stiction index is greater than the pre-set value.

9. The apparatus of claim 8, further comprising the processor having a diagnostics processor configured to check the data samples for detecting valve problems using pre-decided heuristic rules and fuzzy logics comprised in the diagnostics processor.

10. The apparatus of claim 8, wherein the analysis processor is further configured to compute an oscillation regularity of the data samples and to determine if the oscillation regularity is greater than a pre-arranged value.

11. The apparatus of claim 10, wherein the analysis processor is further configured to determine if the valve is at saturation, to determine if there have been changes to the set-point changes that are less than a pre-configured percentage.

12. The apparatus of claim 8, further comprising the processor having a data adjustment processor configured to manage collecting of a predetermined amount of filtered data samples for processing by the analysis processor based on an optimal data buffer length.

\* \* \* \* \*